Dec. 24, 1963  L. R. YESKE  3,114,996
MOWER BREAK-BACK MEANS
Filed April 24, 1961
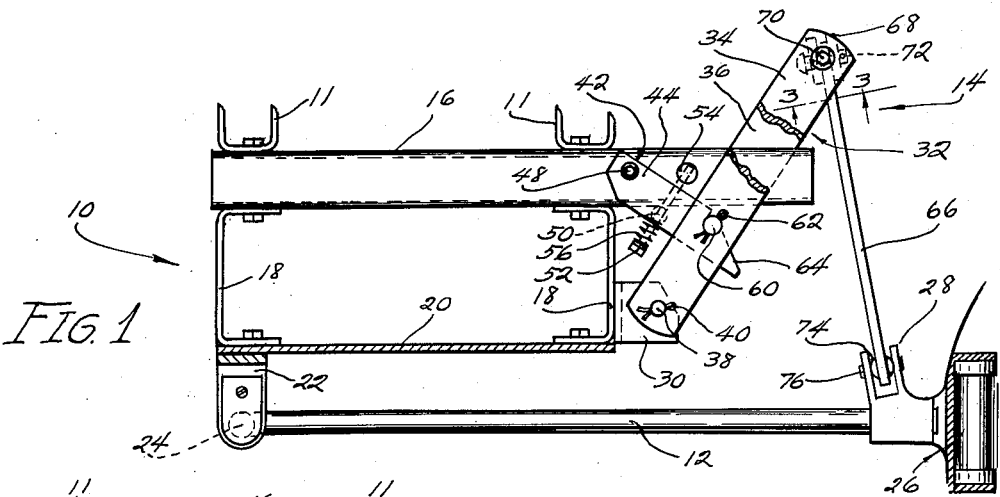
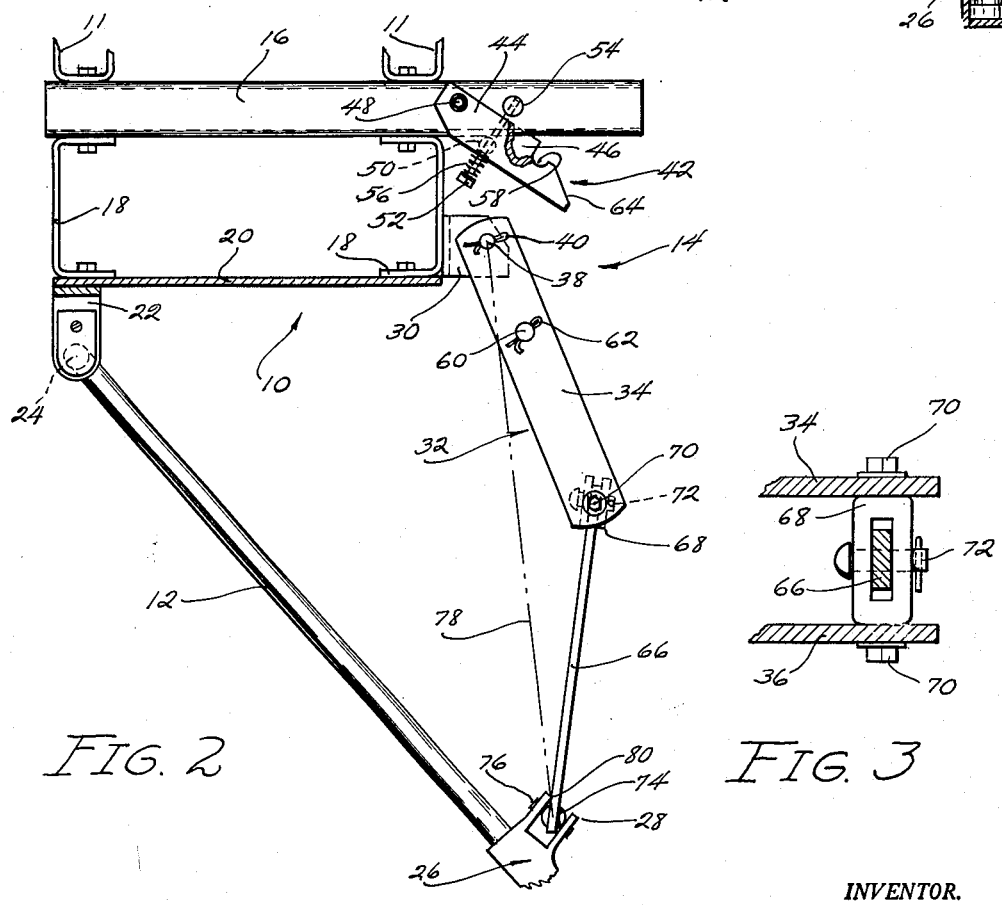
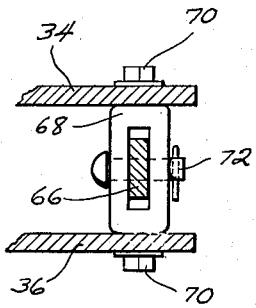
INVENTOR.
LAUREL R. YESKE
BY 3,114,996
MOWER BREAK-BACK MEANS
Laurel R. Yeske, Rockford, Ill., assignor to J. I. Case Company, Racine, Wis., a corporation of Wisconsin
Filed Apr. 24, 1961, Ser. No. 105,141
5 Claims. (Cl. 56—25)

This invention relates to a tractor mounted mower and especially to a break-back means that permits the mower cutter bar to swing rearwardly upon striking an obstruction.

The break-back arrangements now furnished with mowers do not function consistently with respect to the force required to release the cutter bar, because these arrangements are complicated, and furthermore they are expensive to construct.

It is an object of this invention to provide a break-back means that is simple and rugged.

Another object is to provide a break-back means that releases consistently upon application of a predetermined force.

Further objects and advantages of the invention will become apparent from a consideration of the following detailed description taken in connection with the accompanying drawings, wherein an illustrative embodiment of the invention is shown. However, it is to be understood that the invention is not limited to the details disclosed, but includes all such variations and modifications as fall within the spirit of the invention.

Referring to the drawings,

FIG. 1 is a fragmentary plan view of a portion of a tractor mower embracing the invention, and showing the break-back arrangement in the engaged or operating position with parts broken away and shown in section.

FIG. 2 is similar to FIG. 1, but shows the break-back arrangement in its released position.

FIG. 3 is an enlarged sectional view taken at 3—3 of FIG. 1.

Referring again to the drawings, 10 is a mower frame which is usually mounted at the rear of a tractor on supports and carries a drag bar 12, which is pivoted on frame 10, and a break-back mechanism 14.

Frame 10 includes a transverse tubular frame member 16 to which is secured a pair of brackets 18. Brackets 18 carry a mower plate 20 to which a drag bar pivot bracket 22 is fixed.

Drag bar 12 has an upright or first pivot portion 24 which is journaled for rotation in bracket 22, the drag bar being positioned substantially normal to the direction of travel as in FIG. 1 when the mower is being operated. A mower of the conventional type having a shoe 26 is carried at the outer end of drag bar 12, only a fragmentary portion being shown, as it is not part of the invention. A clevis portion 28 is provided as part of shoe 26, the purpose of which will be described.

A release arm bracket 30 is secured as shown to one of brackets 18 in any suitable manner such as by bolting or welding. A release arm 32 comprising upper and lower spaced plates 34 and 36 is pivoted to bracket 30 on a pivot pin or second pivot 38 which is held in place by a cutter pin 40. Bracket 30 has spaced portions extending between the inner surfaces of plates 34 and 36. Plates 34 and 36 are spaced one above and one below the tubular member 16.

A latch 42 is provided having spaced upper and lower elements 44 and 46 respectively, which elements are pivoted on the upper and lower surfaces of member 16 on a pivot bolt 48. A post 50 serves as a spacer to which elements 44 and 46 are secured by welding to form an integral latch. A tension adjusting bolt 52 is passed through a hole in post 50 normal to the axis of the post, and is adjustably threaded into a swivel pin 54 which passes through frame member 16. A compression spring 56 surrounds bolt 52 being compressed between post 50 and the head of bolt 52, and provides the necessary resistance to hold the latch 42, and through it the break-back, in working position under a predetermined load.

The upper and lower elements 44 and 46 are provided with corresponding aligned notches or recesses 58, the purpose of which will be made clear. A latch pin 60 is positioned in plates 34 and 36 at a point spaced from pin 38 and perpendicularly in holes in plates 34 and 36, and is held axially by cotters 62. A cam surface 64, on elements 44 and 46, is so proportioned that pin 60 will ride over the surface 64 and come to rest in notches 58 when arm 32, as shown in FIG. 2, is being pivoted counterclockwise when resetting the break-back means.

A pull bar 66 is connected at one end thereof to the free end of release arm 32 by means of a yoke 68 pivoted on a pair of upright bolts 70. Bar 66 is also pivoted on a horizontal axis in yoke 68 as on a pin 72, thus providing in effect a universal joint best shown in FIG. 3. The other end of bar 66 is pivoted in above-mentioned clevis portion 28 on a ball joint 74 which is secured in clevis portion 28 by a pin 76. This pivoting arrangement is conventional and need not be further described.

It is necessary to prevent the axis of bolt 70 from going over "dead center" by passing across line 78 of FIG. 2, during break-back. Should bolt 70 cross line 78, it would be necessary for the operator to dismount from the tractor and manually shift the arm 32 counterclockwise in order to permit restoring the mower to operating position. This situation is prevented by permitting the bar 66 to contact the inner face of clevis portion 28, as at a point 80, when the break-back linkage assumes the position shown in FIG. 2.

When an obstruction is encountered during operation of the mower, the resulting abnormal rearward pull on the pull bar 66 will force pin 60 out of notch 58 against the compression of spring 56, permitting the drag bar 12 to assume the position shown in FIG. 2. The amount of abnormal pull which will cause this action is determined by the aforesaid adjustment of bolt 50 in post 54.

When it is desired to reset the break-back linkage after it has thus been released, it is merely necessary to back the tractor with the mower cutter bar resting on the ground until pin 60 passes over cam surface 64 and comes to rest in the notch 58, thus resetting the mower for continued mowing.

The above being a complete description of an illustrative embodiment of the invention, what is claimed as new and desired to be secured by Letters Patent of the United States is:

1. In a tractor mounted mower having a mobile frame member disposed generally transversely of the direction of travel of the tractor, the combination with said frame of a pivot rearwardly of and at one end of said frame member, and supported therefrom, a drag bar carried on said pivot and extending transversely of the direction of travel and swingable rearwardly about said pivot away from said frame member, a pivot supported from said frame member at the end remote from the first-mentioned pivot, a release arm member pivotally supported on said pivot and extending forwardly and laterally as related to said first-mentioned pivot, a pull bar pivotally connected to the forward extremity of said release arm member and pivotally connected to said drag bar at a point spaced from said first-mentioned pivot substantially rearwardly of said forward extremity of said release arm member, a latch pin on one of said members, a latch pivotally mounted on the other member and having a recess facing in the direction of swinging of said latch, and resilient means continuously urging said recess and said latch pin into engagement with each other to transmit the movement of said frame to said release arm member, and thereby to said pull bar and to said drag bar, said latch and said latch pin being constituted to become disengaged by reason of excessive pull in said pull bar.

2. In a tractor mounted mower having a mobile frame member disposed generally transversely of the direction of travel of the tractor, the combination with said frame of a pivot rearwardly of and at one end of said frame member, and supported therefrom, a drag bar carried on said pivot and extending transversely of the direction of travel and swingable rearwardly about said pivot away from said frame member as a result of contact with an obstruction, a pivot supported from said frame member at the end remote from the first-mentioned pivot, a release arm member pivotally supported on said pivot, extending laterally as related to said first-mentioned pivot, and having a free end, a pull bar pivotally connected to the free end of said release arm member and pivotally connected to said drag bar at a point spaced from said first-mentioned pivot substantially rearwardly of said free end of said release arm member, a latch pin on one of said members, a latch pivotally mounted on the other member and having a recess facing in the direction of swinging of said latch, and resilient means continuously urging said recess and said latch pin into engagement with each other to transmit to movement of said frame to said release arm member, and thereby to said pull bar and to said drag bar, said latch and said latch pin being constituted to become disengaged by reason of excessive pull in said pull bar.

3. In a tractor mounted mower having a frame member disposed generally transversely of the direction of travel of the tractor, the combination with said frame of a pivot rearwardly of and at one end of said frame member, and supported therefrom, a drag bar carried on said pivot and extending transversely of the direction of travel and swingable rearwardly about said pivot away from said frame as a result of contact with an obstruction, a pivot supported from said frame member at the end remote from the first-mentioned pivot, a release arm member pivotally supported on said pivot and extending forwardly and laterally as related to said first-mentioned pivot, a pull bar pivotally connected to the forward extremity of said release arm member and pivotally connected to said drag bar at a point spaced from said first-mentioned pivot substantially rearwardly of said forward extremity of said release arm member, a latch pin on said release arm member, a latch pivotally mounted on said frame member for swinging movement thereon and having a recess facing in the direction of swinging of said latch, and resilient means continuously urging said latch in a direction such that said recess and said latch pin will be forced into engagement with each other to transmit the movement of said frame to said release arm member, and thereby to said pull bar and to said drag bar, said latch and said latch pin being constituted to become disengaged by reason of excessive pull in said pull bar.

4. In a tractor mounted mower the combination of a frame disposed generally transverse to the direction of travel of the tractor and including a transverse frame member projecting beyond the margin of said frame at one end thereof, a pivot at the other end of said frame and supported therefrom, a drag bar carried on said pivot and extending transversely of the direction of travel and swingable rearwardly about said pivot away from said frame as a result of contact of the mower with an obstruction, a pivot supported from said frame at the end remote from the first-mentioned pivot, a bifurcated release arm member
including an
upper plate and a
lower plate disposed respectively above and below the projecting portion of said transverse frame member, said reelase arm being pivoted on and extending from the second-mentioned pivot forwardly and laterally as related to the direction of travel, a pull bar pivotally connected to the forward extremity of said release arm member and pivotally connected to said drag bar at a point spaced from said first-mentioned pivot, substantially rearwardly of said forward extremity of said release arm member, a latch pin, engaged with and bridging the space between said upper and said lower plates, spaced between said second-mentioned pivot and said forward extremity of said release arm, a latch pivotally mounted on said transverse frame member for swinging movement thereon and having a recess facing in the direction of swinging of said latch, said latch being positioned to enter the space between said upper and lower plates, in one position of said release arm, with said recess so located as to engage said latch pin, and resilient means engaged with said projecting portion of said transverse frame member, and with said latch in position to urge said recess into engagement with said latch pin to transmit the movement of said frame to said release arm member, and thereby to said pull bar and to said drag bar, said latch and said latch pin being constituted to become disengaged from each other by reason of excessive pull in said pull bar.

5. In a mower the combination of a frame disposed generally transverse to the direction of travel of the mower, a pivot at one end of the frame and supported therefrom, a drag bar carried on said pivot and extending transversely of the direction of travel toward the other end of said frame, and swingable rearwardly about said pivot away from said frame as a result of contact of the mower with an obstruction, a pivot supported from said frame at said other end thereof, a release arm element supported on the second-mentioned pivot and extending generally forwardly in the direction of travel, a pull bar element pivotally connected at one end to the forward extremity of the release arm and pivotally connected at the other end to said drag bar, rearwardly and slightly laterally of said second-mentioned pivot, means for yieldably maintaining said release arm in said forwardly extending position, whereby said release arm may be released in the event of excessive pull in said pull bar to swing in a direction toward alignment with said pull bar, and permit substantial rearward swinging of said drag bar, and stop means positioned to engage one of said elements when said elements approach alignment and prevent complete alignment of said elements, whereby said drag bar may be swung in a relatively forward direction to restore the mower to working position, without interference by said release arm and pull bar elements.

References Cited in the file of this patent

UNITED STATES PATENTS

| | | |
|---|---|---|
| 1,973,993 | Pearson | Sept. 18, 1934 |
| 2,225,156 | Coultas | Dec. 17, 1940 |
| 2,520,745 | Favor | Aug. 29, 1950 |
| 2,775,855 | Rickey | Jan. 1, 1957 |
| 2,880,562 | Vutz | Apr. 7, 1959 |